July 9, 1968 R. R. BARTRON 3,392,074
METHOD AND APPARATUS FOR PRODUCING COUNTER TOPS
Filed Feb. 24, 1966 6 Sheets-Sheet 1

INVENTOR
ROBERT R. BARTRON,
BY Stone & Mack.
ATTORNEYS

July 9, 1968  R. R. BARTRON  3,392,074
METHOD AND APPARATUS FOR PRODUCING COUNTER TOPS
Filed Feb. 24, 1966  6 Sheets-Sheet 2
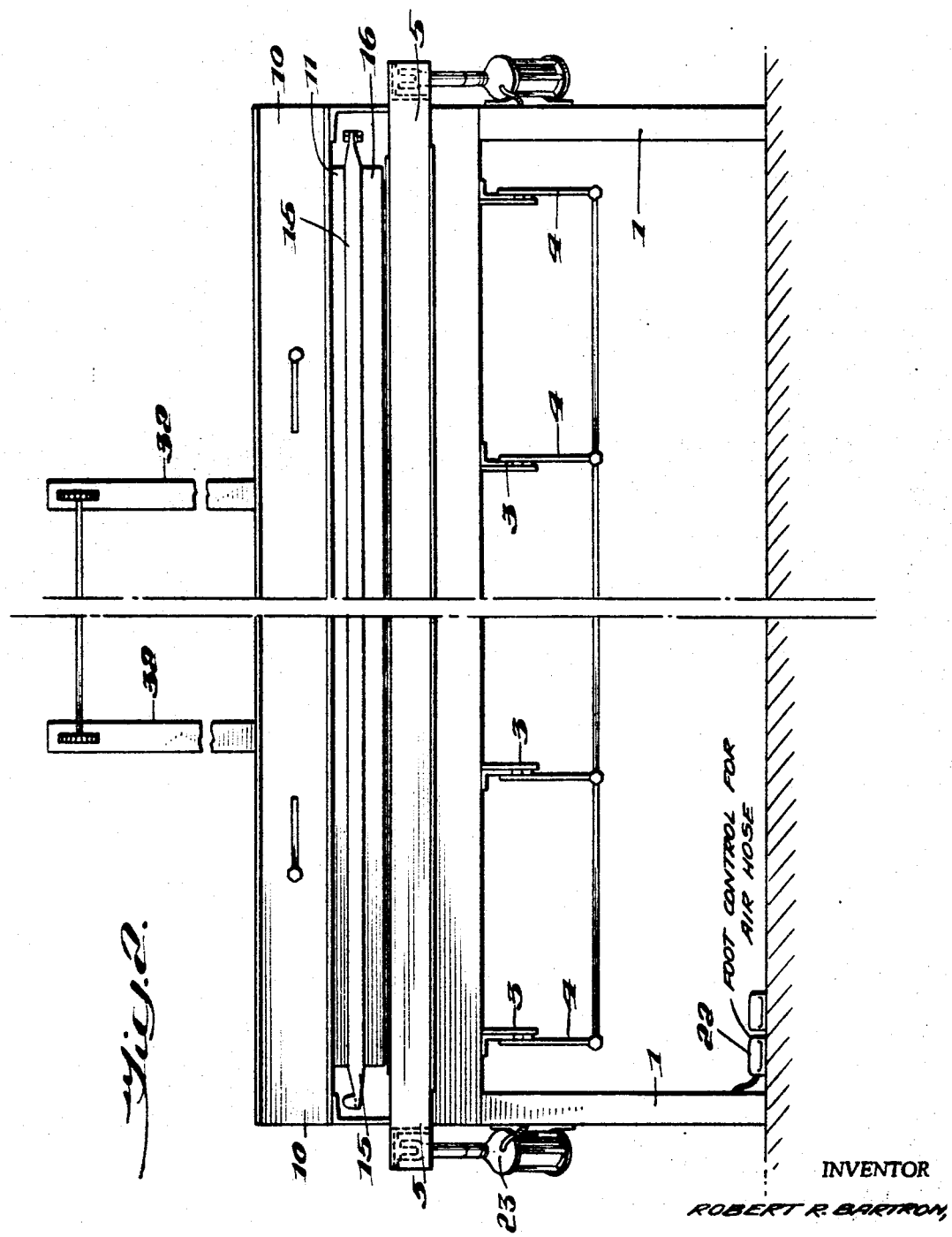
INVENTOR
ROBERT R. BARTRON,
BY Stone + Mach.
ATTORNEYS

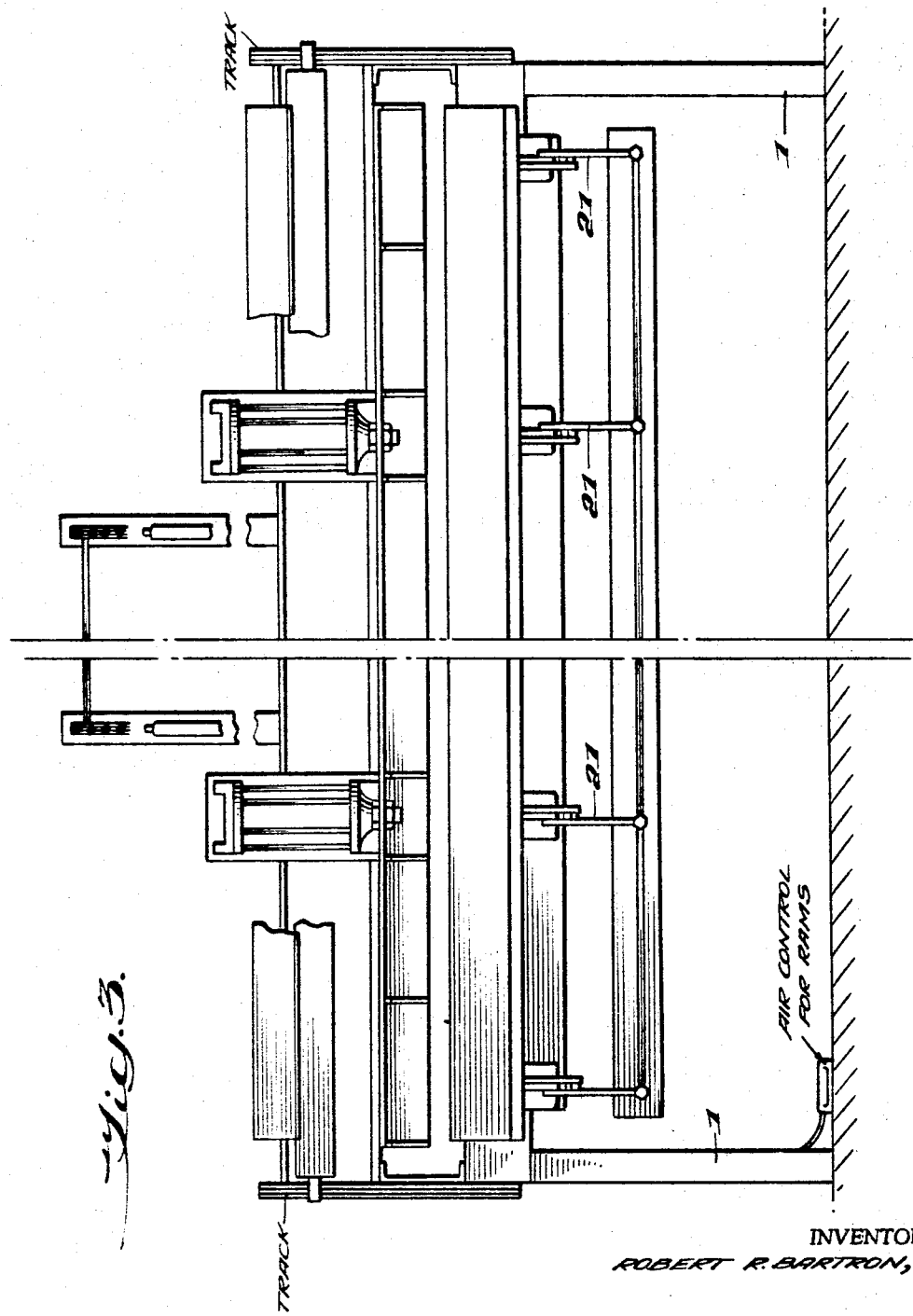

July 9, 1968  R. R. BARTRON  3,392,074
METHOD AND APPARATUS FOR PRODUCING COUNTER TOPS
Filed Feb. 24, 1966  6 Sheets-Sheet 4
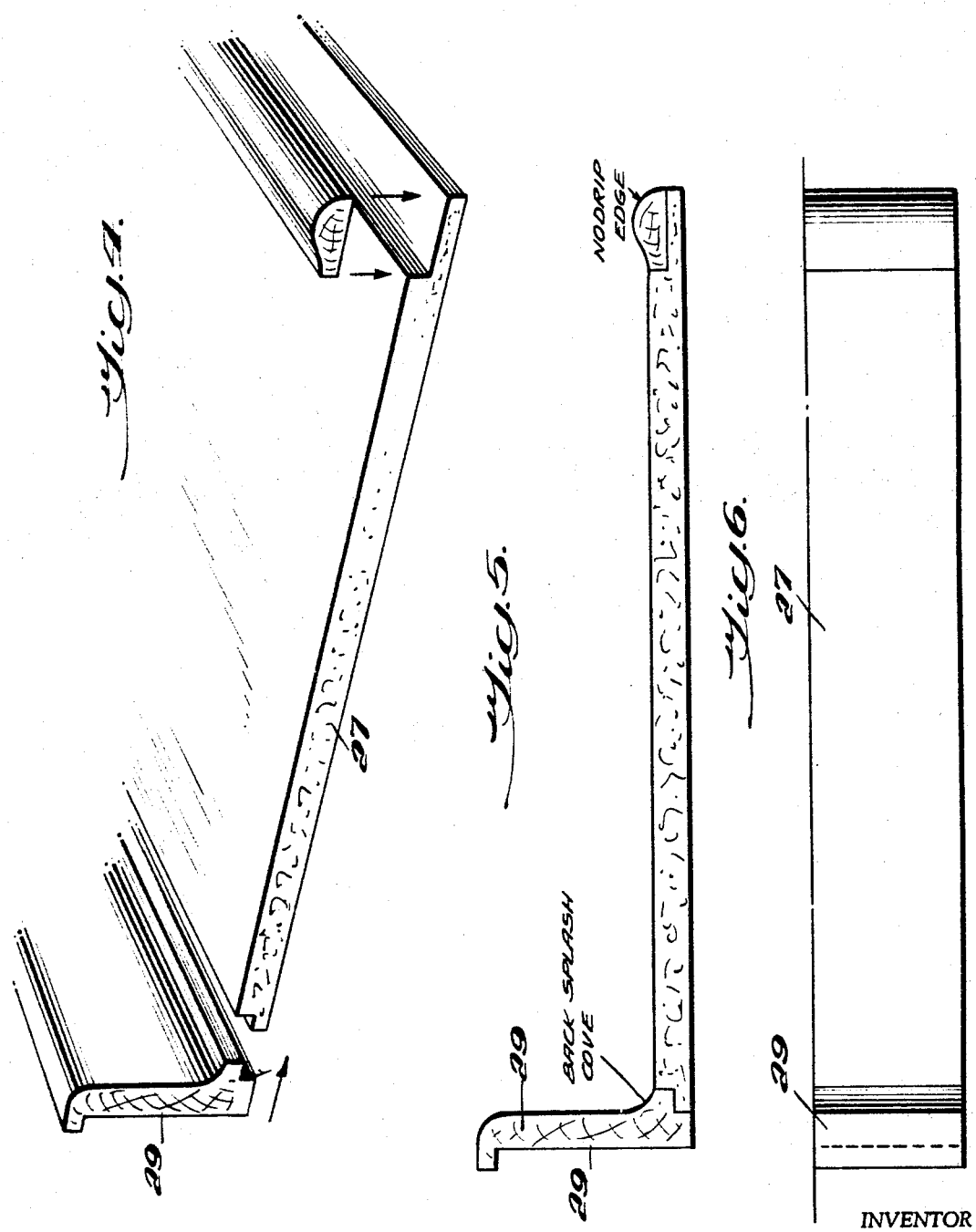
INVENTOR
ROBERT R. BARTRON,
BY *Stone & Mack,*
ATTORNEYS INVENTOR
ROBERT R. BARTRON,
BY Stone + Mack.
ATTORNEYS

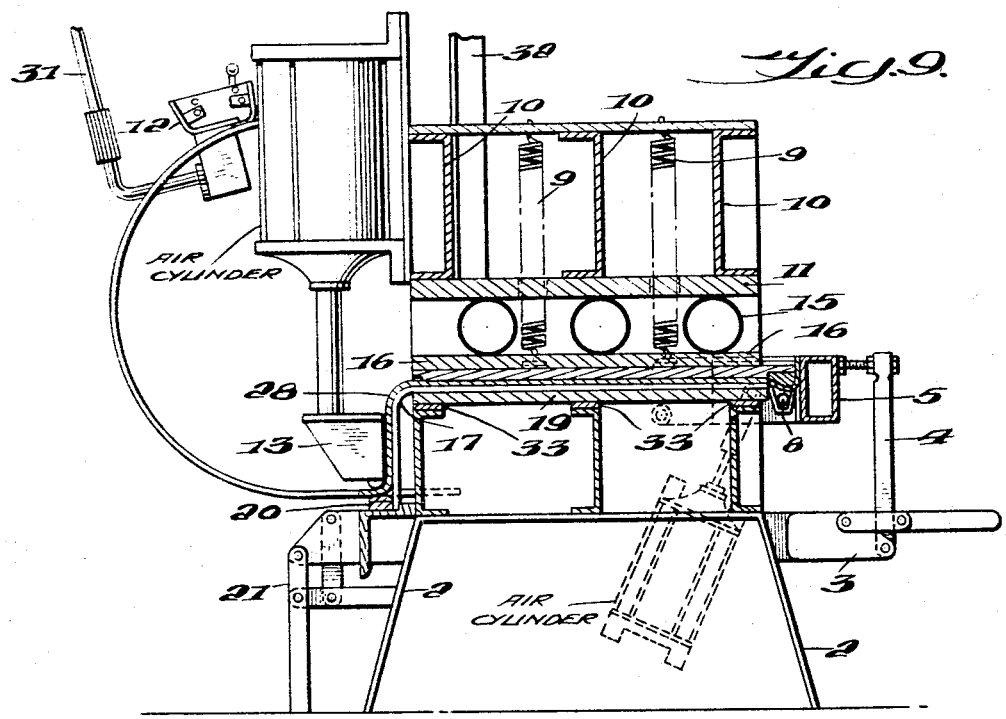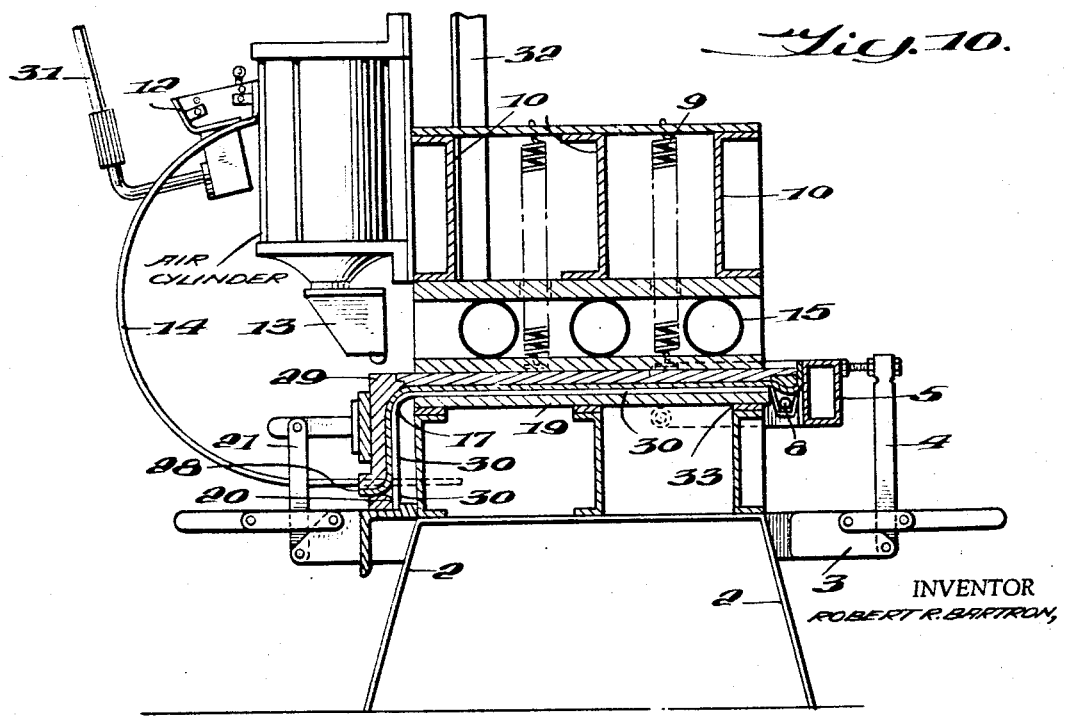

United States Patent Office 3,392,074
Patented July 9, 1968

3,392,074
METHOD AND APPARATUS FOR PRODUCING COUNTER TOPS
Robert R. Bartron, Tacoma, Wash., assignor to Form-Rite Plastic Company, Inc., Seattle, Wash., a corporation of Washington
Continuation-in-part of application Ser. No. 138,973, Sept. 18, 1961. This application Feb. 24, 1966, Ser. No. 534,952
7 Claims. (Cl. 156—216)

ABSTRACT OF THE DISCLOSURE

This invention relates to an improved method of and novel apparatus for manufacturing such products as fully formed counter tops, kitchen drainboards and the like which are characterized by the use of plastic sheet material on a supporting base of plywood or its equivalent. To that end, the plastic is formed in one continuous sheet without break or seam from the front to the back up the vertical surface and return to the extreme back of the counter top to the point of juncture with the wall. In effecting such an operation there is provided novel means for bending and shaping plastic sheets. Also means for gluing and pressing such sheets so as to mount such sheets on underlayment blanks, all combined with means for forming a back splash bend wherein all three of said means are positioned for positive operation without the necessity of moving the materials from their original position.

---

This is a continuation-in-part of application Ser. No. 138,973, filed Sept. 18, 1961 for Method and Apparatus for Producing Counter Tops, now abandoned.

This invention relates to an improved method of and novel apparatus for manufacturing such products as fully formed counter tops, kitchen drainboards, bath vanities and the like which are characterized by the use of plastic sheet material on a supporting base of plywood or its equivalent. In preparing fully formed drainboards and vanities it is desirable to form the plastic in one continuous sheet without break or seam from the front of the drainboard or no-drip front, to the back cove, up the vertical surface of the backsplash and return to the extreme back of the counter top to the point of juncture with the wall.

One of the features of novelty in this improved method and apparatus pertains to the materials entering into the construction and the particular treatment accorded those materials with the result that a product of considerable area and of considerable strength is produced.

Yet another feature of improvement which characterizes this invention pertains to the method and means whereby in the manufacture of counter tops and drainboards there is provided novel means for bending and shaping plastic sheets, also means for gluing and pressing such sheets so as to mount such sheet on underlayment blanks, all combined with means for forming a back splash bend, wherein all three of said means are positioned for positive operation without the necessity of moving the materials from their original position.

Without this sequence of treatment in a single machine, at least three separate machines would be necessary, one for each step.

One of the features of advantage arising from this improved method and apparatus is that the method and the apparatus may be operated by a fewer number of mechanics than has heretofore been feasible, and thus the method and apparatus of this invention has resulted in considerable financial saving.

The foregoing and additional features of the method and apparatus will be described and claimed in detail in the following specification and claims when considered in light of the accompanying drawings, in which:

FIG. 2 is a side elevation shown in FIG. 1 looking at the no-drip side, i.e. the side into which the material to be treated is introduced;

FIG. 3 is a side elevation of the side of the machine opposite to that shown in FIG. 2;

FIG. 4 is a perspective view of the underlayment blank to which the plastic covering is to be affixed pursuant to the operation of the step of the method. In this view, the opposite edge portions for the advance or no-drip edge and the back splash or cove portion are shown separate from the main area of the counter board, which latter is in proportion for a counter of about two feet in width;

FIG. 5 is a vertical sectional view of the counter board shown in FIG. 4 but showing the no-drip strip and the back splash strip added to the main counter board;

FIG. 6 is a top plan view of a portion of the board shown in FIG. 5; and

Figure 1:
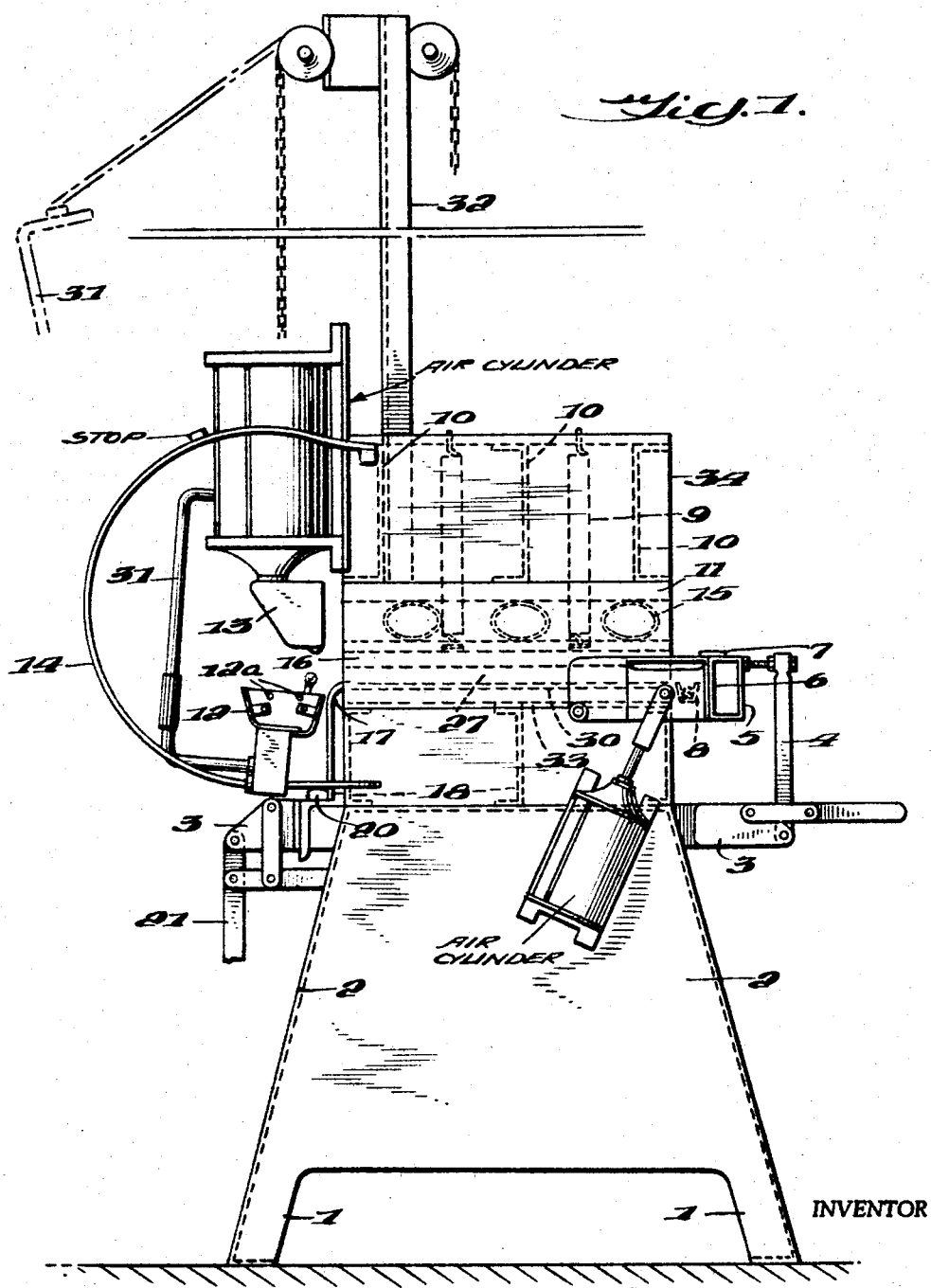
FIG. 1 is an end view of the machine in which the method of this invention may be practiced.

FIGS. 7–10 inclusive are views illustrating the several steps in the operation of the machine shown in FIGS. 1, 2 and 3 and in the course of which operation the machine is operated to carry out the several steps of the method described and claimed.

The method and the apparatus for performing the method as illustrated in the several figures pertains to the production of a counter top, bath vanity top, or kitchen drainboard suitable for use in standard kitchen or bathroom cabinets. The invention pertains to means for bending, fabricating and laminating decorative plastic sheets to suitably designed and constructed underlayment and molding supporting structure. This is possible according to the present invention at a minimum cost, the combination of plastic sheeting and supporting structure being effected by combining the use of air pressure, heat and manually operated mechanism whereby details of bending, pressing and lamination are completed in one single machine. That machine completes the shaping of the forward edge of a drainboard top having a desired no-drip bend, also the desired back splash cove bend at the rear edge of the drainboard and also the top of the upwardly extending rear wall of the drainboard known as the top of the back splash portion, and all of these features are completed in one series of operations without moving the material after it has been first introduced into the machine for treatment.

The foregoing provides a distinct saving in expense and in the use of machines. Heretofore it has been customary to use three machines to accomplish what is performed by the machine of the present invention. For example, one machine has been used to bend a plastic sheet; another machine has been used to preform a pressing operation; and still a third machine has been used to form the back splash bends, thus requiring movement of the material being treated from one machine to another. This is in contrast to the features of the machine of this invention which bends, forms, laminates, presses and makes the back splash structure all in one machine in a single series of operations.

In conducting the essential steps of the method of this invention, suitable plyboard or fiber board of the correct width and length, and which is termed an underlayment blank, is coated on its ultimate upper face with cement which is spread evenly. This blank is then placed cement side downward on a piece of decorative plastic sheeting with the decorative face of the sheet downward. The underlayment blank with the decorative sheeting is then inserted laterally into the machine shown in FIGS.

1 and 2, with the decorative plastic surface downward.

Up to this stage the plastic sheet extends in a single plane.

The introduction and withdrawal of the underlayment blank and its plastic covering is possible by reason of the fact that the means for exerting pressure is held up and spaced away from the lowermost supporting means by a series of springs. Thus the machine is normally in the open or receiving position on the right side looking at FIGS. 1 and 2. When pressure is applied to the underlayment blank and the plastic sheet beneath it, the mechanism above the underlayment blank is forced down against the tension of the series of springs.

Assuming that air pressure has been applied downward on the underlayment blank, such pressure is maintained until the treatment of the underlayment blank and plastic sheet is completed.

One heat source for forming is located adjacent the back splash area of the underlayment blank and a second heat source for forming is located adjacent the forward or no-drip edge of the underlayment blank. The heater adjacent the back splash is next manually pulled into position. Next a jig for treating that edge of the assembly which is to be the forward edge of the ultimate product is brought into position by air cylinders and secured where required for positive bonding by suitable clamps. Next, the heater adjacent the back splash area is returned to its original position and a jig for determining the curvature of the back splash area is brought into position and that portion of the plastic sheet is thus shaped with the desired curve or cove where the plastic sheet extends away from the main area of the underlayment blank. The last mentioned jig is next returned to its original and inoperative position. The back splash projection which will occupy the usual upright position at the rear of a drainboard is placed in position, after having been suitable coated with cement, and is secured with clamps.

Lamination is completed in approximately two minutes. All parts are then released including the clamps and air pressure and the completed drainboard is then removed from the mahcine from the back splash side or namely from the side opposite to the receiving side of the machine. It has been demonstrated that a single operation from the application of the first cement coating to the finished product can be completed in approximately 4 to 6 minutes.

The foregoing describes briefly the several steps for operation of the method but without specific description of the machine and its manipulation.

*The machine and its manipulation in detail*

In the following, there is described in detail a machine for conducting the method of this invention. In general, the machine illustrated may be approximately 15 feet in length as shown in FIGS. 2 and 3, and less than one-third that measurement in end view as in FIG. 1. For convenience, the working parts of the machine are elevated from the floor so as to be at convenient working level. The framework is formed of sheet steel as shown in the end view, FIG. 1. The lower or floor engaging portions are formed of legs 1 which have angle iron flanges from the floor end to the upper or table end. Just above the leg portions the end member 2 is a continuous plate extending from one side of the machine to the other. Extending lengthwise of the machine and at opposite sides thereof are angle iron clamp supports 3 for holding the clamps 4 and 21 which are adapted to hold the work in place and under suitable pressure as will now be explained.

Looking at FIG. 1, the clamps 4 and 21 are for applying pressure to the air operated bending jig 5 after the plastic sheet has been formed around the plywood underlayment and molding combination. The pressure exerted by the clamps can be specifically regulated to apply the required pressure of three pounds to the square inch to the back surface of the air operated no-drip forming jig 5 which in turn applies the pressure to the plastic sheet and presses it against the leading edge of a no-drip front of the counter top being manufactured. The application of heat to the portion of the bending jig cures the glue and laminates the plastic to the no-drip molding.

Again referring to FIG. 1, 5 is the air operated combination forming, heat curing and pressing jig which extends the full length of the machine and for the specific purpose of forming the plastic sheet around the no-drip side of the drainboard, that is the right side, after it has been brought to the proper bending temperature of 325°. This is under the influence of the automatically controlled heat unit 8. The jig 5 embodies a rectangular chamber having its inner wall 6 consisting of a plate adapted to press against the outer face of the upturned edge of the plastic sheet to heat the same. When the jig 5 and the plate 6 are in this upper or working position the element 7 is adapted to lie across the top plastic strip and across the top of the jig 5 and both of these elements 6 and 7 are heat controlled by thermostat to effect the curing of the glue and the lamination of the plastic sheet to the no-drip front edge of the underlayment. The strip 7 extends lengthwise of the machine. The jig 5 is brought into position by an air cylinder forming the plastic sheet around the no-drip portion. It then clamps the jig in position while the heated area of jig 5 and metal plates 6 and 7 with the heat strip behind and controlled by thermostat cures glue and laminates plastic to the no-drip front edge. All of this reference to the jig 5 refers to the right hand portion of the structure shown in FIG. 1.

The wall 6 is a fiber glass heat strip, thermostatically controlled at 250°, for curing the glue of the no-drip side of the drain board after the plastic sheet has been formed by the jig 5.

The element 7 is a heat conductive metal sheet which presses against the plastic sheet after it has been formed by the jig 5.

8 identifies a radiant heater which is an operating part of the no-drip forming assembly. After the air pressure is applied to the fire hose sections 15, the single unit radiant heater 8 automatically comes into operation in conjunction with the heater 12 and is counterbalanced to work in conjunction with the heater 12. When the heater 12 is manually brought down into operative position on the back splash side, that is on the left side looking at FIG. 1, the heater 8 rises into position on the front or no-drip side, that is, the right side with reference to FIG. 1, for the purpose of heating the decorative plastic sheet to be formed to the underlayment blank. The radiant heater 8 is controled by a timer situated on the radiant heater 12. When the plastic sheet has reached a proper bending temperature at the end of the controlled heat cycle, the heater 12 is returned to its upper or "not in use" position and the operator then pushes the air pedal, on the floor, as shown in FIGS. 2 and 3, and the air operated forming jig 5 shapes the plastic around the no-drip molding and is secured by the clamp 4.

Pressure for holding together the parts which are being treated is exerted by means of air introduced into a plurality of hose sections 15, as will be explained. Springs 9 are used to hold the bottom press board 16 normally upwardly against the sections of fire hose. After the press cycle is complete and air pressure released, the springs collapse the fire hose and ready the press for the next pressing operation by lifting the press board 16.

On the end legs and end plates the machine has mounted three standard channel members 10 extending the full length of the machine and for the specific purpose of serving as a stiffening construction to keep the top press board 11 straight when air pressure is applied to the fire hose sections by the air valve whereby to press the pre-glued underlayment to the decorative plastic sheet against the heated table top 30. In brief, the top press board 11 is of sturdy construction and preferably extends the full length of the machine where it engages the upper surface of the hose members 15. The top press board may be made of one and one-half inch laminated heat treated plywood. It serves not only as a base for the stiffening channel elements 10 but also as an upper press element for equalizing the pressure from the fire hose sections 15 downwardly against the lower press board 16. The lower press board 16 also extends the full length of the machine and is suspended in place by springs 9, leaving it free to move up and down as air pressure is applied and released on the air hoses 15.

The radiant heater 12, shown at the left in FIG. 1, extends the full length of the machine and is for the specific purpose of heating the back splash portion of the decorative plastic sheet preliminary to forming the plastic sheet around the back splash radius 17 of the heated metal forming plates 30. The heater 12 travels from the "Stop" or upper position on the track 14 to a position under the plastic sheet by manually directed travel by means of the handle 31 and counterbalanced jig 32. The heater 12 goes into operation when air pressure is applied to the hose sections 15. The heaters serve to heat the plastic back splash portion of the sheet to 325° and turn it off automatically. This is controlled by the timer 23 when the plastic is ready to be formed. (See timer 23 at left end of Sheet 2.)

The apparatus for forming the back splash portion of a counter is identified at 13. In explanation for the term "back splash," it will be understood that the counter for a pantry or kitchen is provided with an upstanding rear wall preferably formed so as to extend vertically from a horizontal main counter area for a distance of about 4 inches. See FIGS. 4, 5 and 6. This upright wall should have a continuous surface with the surface of the horizontal portion. According to the method and the apparatus of this invention, the jug 13 extends the full length of the machine. After the heater 12 has heated the plastic to bending temperature, the operator activates the air valve controlling the air cylinder on the lower end of which the jig 13 is positioned. The jig moves downwardly pressing the plastic sheet downwardly and over the radius indicated at 17 and down to the top of the back splash position 20. At the same time the air operated no-drip assembly 5 is activated and performs its function likewise by admitting air to the air cylinder which forces the structure at 5 upwardly to the position shown in solid lines at the right of FIG. 1. Thus there is formed in one operation the back splash cove and the top of the back splash, and also there is formed the no-drip front edge of the drainboard. The term "no-drip" is used to identify the front edge portion of the counter as contrasted to the upstanding rear portion or back splash area. Upon release of air pressure, the air operated back splash forming jig 13 returns to its upper position and temporarily out of the operator's way in preparation for the back splash plywood underlayment assembly 29 to be pressed into position by the clamp 21. It will be noted that the back splash plywood underlayment assembly 29 is united to and affixed to the horizontal underlayment structure at this stage.

Air hoses 15 are indicated for the specific purpose of applying pressure to the bottom of the press assembly 16 and thus also applying pressure against the drainboard or main underlayment assembly 27 which is pressed against the plastic sheet 28. The plastic sheet 28, next above the heated metal platen 30, is cause to be laminated to the drainboard underlayment 27 as a result of the glue being cured with heat and pressure. In this relation the heat is transferred from the metal platen to the plastic sheet.

16 identifies the bottom plywood press board held in position against the fire hose sections 15 by the arrangement of springs 9, as has been described.

17 identifies the back splash radius part of the heated metal platen 30 acting as a forming agent for the coved part of the drainboard. The plastic sheet 28 is formed over this radius and into the top of the back splash bend by the action of the forming jig 13.

18 identifies channel members which rest on the upper face of the table ends and extend the full length of the machine. The channel elements 18 serve as a main and strong back for the table. One side of the channel members rests on the upper edge of the end walls 2 and the opposite sides of the channel members 18 face upwardly. On the channel members 18 is positioned a Transite base which is machined perfectly on its upper surface to insure perfect alignment with the metal platen 30.

20 indicates the uppermost limit or stop for the movement of the jig which controls the bending of the back splash portion and the heating of the glue and its curing. When the plastic sheet is formed over the radius 17 by the jig 13, this unit acts as a stop for the top of the back splash bend. The stop 20 is removable if the top of the back splash portion requires a specific shape. The stop is adjustable for different heights if the requirements of counter tops make such adjustability desirable. The top of the element 20 has a heated metal plate thermostatically controlled to coincide with the temperature of the heated metal platen 30.

Clamps 21 are indicated for applying pressure to the back splash assembly 29 against the plastic sheet 28 thereby laminating the plastic sheet 28 to the back splash assembly 29 when pressed against the heated metal platen 30.

22 indicates an air pressure valve located at the floor level (FIG. 2). 23 indicates thermostats in control boxes as shown at the left in FIG. 2.

The underlayment assembly 27 is shown next the filler board 26.

With the plastic sheet 28 facing downwardly to the main portion of the underlayment blank, the back splash portion 29 is adhesively secured so that the plastic sheet 28 will follow the curve as at 17.

On the upper surface of the channel members 18 there extends the heated metal table top platen 30 which is formed to the desired shape of the drainboard specified. A fiber glass heat element is cemented to its bottom side. Heat is thermostatically controlled for the specific purpose of curing the glue used to laminate the plastic sheet to the underlayment blank, namely, to secure the plastic sheet to the undersurface of the underlayment blank, the decorative surface of the plastic sheet facing downwardly as in FIG. 1.

31 is a handle attached to the heat jig 12 to manually position the jig 12 with the assistance of a counterbalancing arrangement 32, this including an upright post at the upper ends of which are pulley wheels over which pass chains extending from a handle and to a counterweight. The counterbalancing assembly is used to balance the weight of the heat jig 12 when positioning it for heat sequence.

33 indicate machine steel strips extending the full length of the machine and resting on the upper surface of the uppermost side of the channel elements 18. These strips 33 support the Transite base 19 which is machined perfectly to give a true base for the steel table top platen 30.

34 identifies a sheet metal cover to protect the press including hose sections and springs.

Figure 8:
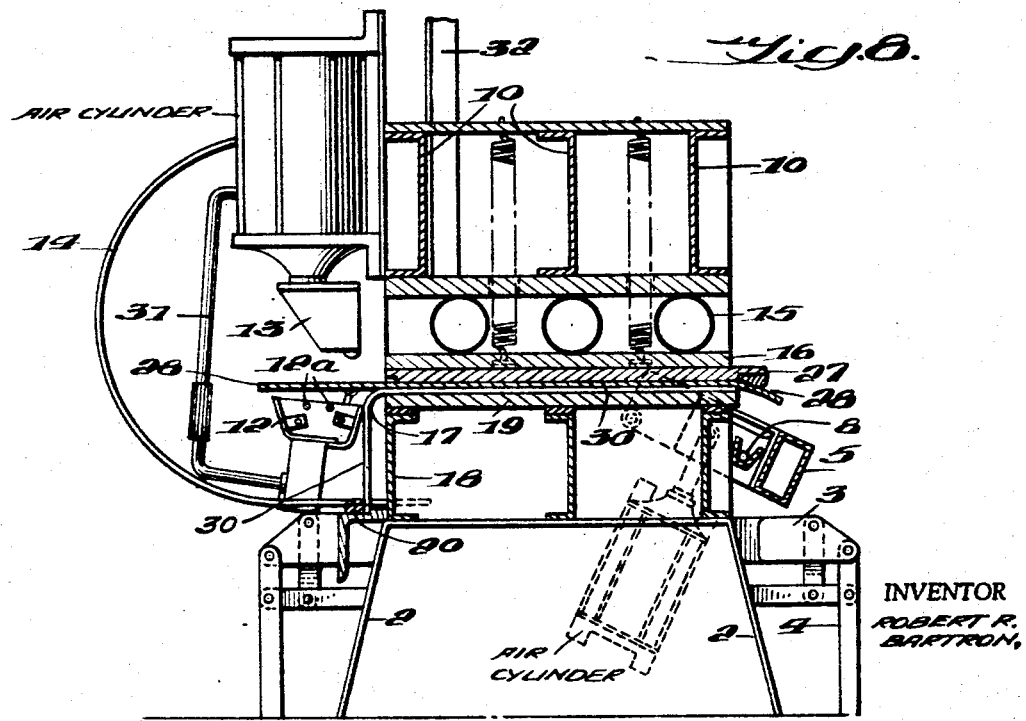

The following sequence of operations is used in manufacturing a fully formed high pressure laminated counter top. A glued up underlayment blank 27 (FIG. 5) is positioned on a decorative plastic sheet 28 exteriorly of the machine and is slid into position, from right to left, according to FIGS. 1 and 8, that is from the no-drip side and between the press board 16 and the steel platen 30. When in the correct position, the air pressure valve 22 is turned on and the hose sections 15 are inflated to apply pressure downwardly pressing the counter top against the heated platen 30, the plastic sheet 28 being between the blank 27 and the platen 30. While heat is laminating the plastic to the underlayment blank, the operator may move around to the splash side of the machine, that is, to the left side, as shown in FIGS. 1 and 8, and he brings the radiant heater 12 downward into position under the plastic back splash portion, namely, to the position shown in FIG. 8. At the same time the radiant heater 8 comes up under the no-drip portion of the drainboard, specifically under the extreme right hand margin, looking at FIG. 10. When the desired forming temperature is reached, the radiant heaters 8 and 12 are returned to their off positions and the operator activates the air cylinders at the opposite sides of the machine. The no-drip forming jig 5 is swung into position, forming the plastic covering around the no-drip molding, and the back splash forming jig 13 comes straight down and shapes in one operation the plastic around the curve 17 and to top of the back splash position 20. Clamps 4 are positioned to hold the jig 5 in place while the glue is being cured by the heater element 7 on the no-drip side. Air pressure is released on the air cylinder 13 and the one piece glued up back splash assembly 29 is put into position and secured by clamps 21 until the glue curing cycle is complete.

When the foregoing and the curing action is complete, all clamps are released; air pressure in the hose sections is released and the completed counter top is removed from the left side of the machine looking at FIG. 1. The machine is now ready for another cycle beginning with the introduction into the right or no-drip side of the machine.

Figure 7:
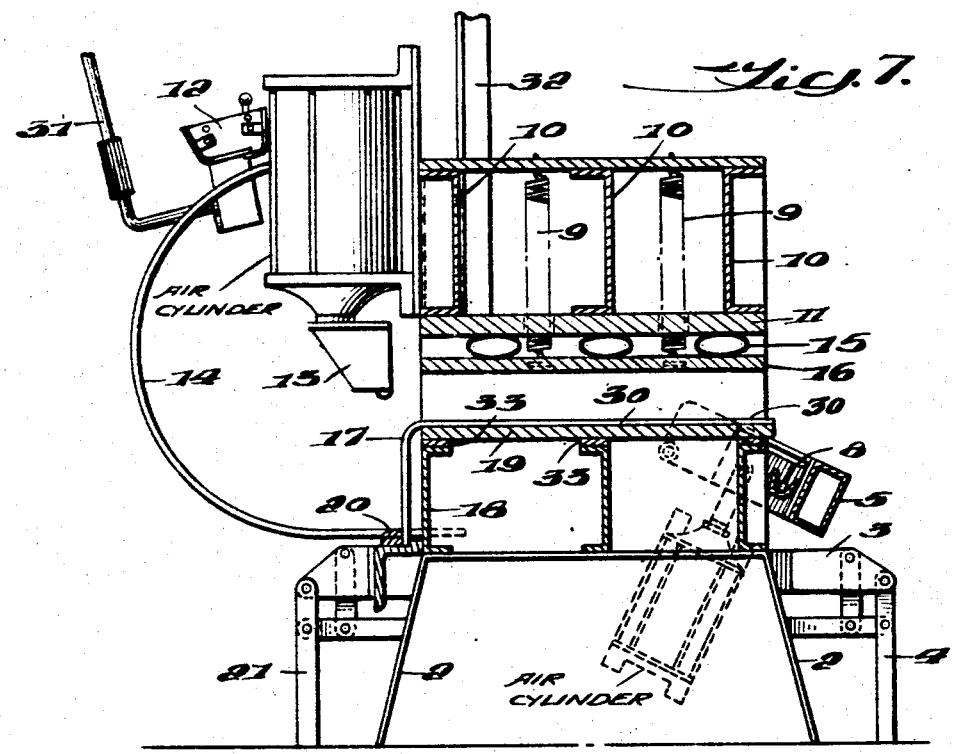

The several stages in the operation of the machine are illustrated somewhat diagrammatically in FIGS. 7, 8, 9 and 10. In FIG. 7, the machine is shown in its open position with no plastic sheet or laminated assembly between the pressure means and the supporting table. As shown in FIGS. 7–10 inclusive, the jig 13 for rolling the plastic sheet downwardly over the back splash portion is adapted to extend the length of the machine. In FIG. 8, the plastic sheet 28 is illustrated on top of the metal sheet 30 and the underlayment assembly 27 rests against the upper surface of the plastic sheet. In this position the heater 12 is shown in the lowered position and the jig 13 is in the upper position.

According to FIG. 9, the heater 12 is up and the jig 13 is shown in its lowermost position after having pressed downward the plastic sheet 28. According to FIG. 8, the laminated underlayment assembly 27 is being subject to pressure by means of air introduced into the hose sections 15.

According to FIG. 10, the heater 12 and the jig 13 have been raised. The one piece back splash underlayment assembly 29 has been placed in position for gluing to the adjacent end of the underlayment assembly 27 and those two parts are being pressed by means of the clamp members 21. At the same time the clamps 4 are adapted to exert pressure against the front or no-drip edge of the main underlayment assembly.

I claim:

1. A method of producing counter tops, comprising
   (a) superimposing one over the other a counter top underlayment blank and a sheet of plastic material, with a layer of adhesive between them and with front and rear portions of the plastic sheet extending beyond the blank,
   (b) pressing the superimposed assembly together and securing it in a fixed position, and while maintaining said assembly in said fixed position performing the subsequent steps of
   (c) heating the extending front portion of the plastic sheet,
   (d) bending the heated extending front portion of the plastic sheet around and pressing it against the front edge of the counter top underlayment blank,
   (e) heating the extending rear portion of the plastic sheet,
   (f) bending the heated extending rear portion of the plastic sheet outward away from the counter top underlayment blank to form a splash molding,
   (g) placing against the inner surface of the bent rear portion of the plastic sheet and the adjacent rear edge of the counter top underlayment blank a splash molding underlaying blank, with a layer of adhesive between them, and
   (h) pressing together to adhesively unite the splash molding and counter top underlayment blanks and the bent rear portion of the plastic sheet.

2. Apparatus for producing counter tops, comprising
   (a) a frame,
   (b) a fixed platen mounted on the frame,
   (c) a movable platen mounted on the frame for movement toward and away from the fixed platen for releasably securing and pressing between them a superimposed assembly of a counter top underlayment blank and a sheet of plastic material,
   (d) front bending means on the frame adjacent to and extending substantially the full length of the front edge of the fixed platen,
   (e) means mounting the front bending means on the frame for movement toward and away from the plane of the fixed platen for bending a projecting front portion of a sheet of plastic material secured between the platens around the front edge of an associated counter top underlayment blank,
   (f) rear bending means on the frame adjacent to and extending substantially the full length of the rear edge of the fixed platen,
   (g) means mounting the rear bending means on the frame for movement toward and away from the plane of the fixed platen for bending a projecting rear portion of a sheet of plastic material secured between the platens outward away from an associated counter top underlayment blank to form a splash molding, and
   (h) rear clamp means on the frame mounted for movement toward and away from a plane rearwardly of and substantially normal to the fixed platen for pressing a splash molding underlayment blank to the rear edge of a counter top underlayment blank and the back surface of the bent rear projecting portion of the sheet of plastic material.

3. The apparatus of claim 2 including front heater means mounted for movement with the front bending means for heating said projecting front portion of a sheet of plastic material prior to bending.

4. The apparatus of claim 2 including rear heater means on the frame mounted for movement toward and away from the plane of the fixed platen for heating said projecting rear portion of a sheet of plastic material prior to bending.

5. The apparatus of claim 2 including front clamp means on the frame mounted for movement toward and away from a plane forwardly of and substantially normal to the fixed platen for pressing to the front end of a counter top underlayment blank the projecting front portion of a sheet of plastic material.

6. The apparatus of claim 2 wherein the means mounting the front bending means on the frame for movement comprises pivot means interengaging the frame and front bending means, and a reciprocative fluid pressure piston-cylinder unit interengaging the frame and front bending means.

7. The apparatus of claim 2 wherein the means mounting the rear bending means on the frame for movement comprises a reciprocative fluid pressure piston-cylinder unit, the cylinder being mounted on the frame and the piston having an extending piston rod supporting the rear bending means.

References Cited
UNITED STATES PATENTS

| | | | |
|---|---|---|---|
| 2,739,637 | 3/1956 | Tyler | 156—299 XR |
| 2,804,909 | 9/1957 | Hammer | 156—222 XR |
| 2,890,919 | 6/1959 | Hansen | 156—216 XR |
| 2,973,025 | 3/1961 | Baillie et al. | 156—475 |
| 3,009,201 | 11/1961 | Hansen | 156—486 XR |
| 3,012,601 | 12/1961 | Lee | 156—583 |
| 3,028,275 | 4/1962 | Peterson | 156—486 |

EARL M. BERGERT, *Primary Examiner.*

R. A. KILLWORTH, *Assistant Examiner.*